(12) United States Patent
Afsharian et al.

(10) Patent No.: US 11,637,492 B2
(45) Date of Patent: Apr. 25, 2023

(54) BUCK MATRIX-TYPE RECTIFIER WITH BOOST SWITCH, AND OPERATION THEREOF DURING ONE-PHASE LOSS

(71) Applicant: Murata Manufacturing Co., Ltd., Nagaokakyo (JP)

(72) Inventors: Jahangir Afsharian, Markham (CA); Dewei Xu, Markham (CA); Bing Gong, Markham (CA)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 17/051,538

(22) PCT Filed: Apr. 30, 2019

(86) PCT No.: PCT/US2019/070004
§ 371 (c)(1),
(2) Date: Oct. 29, 2020

(87) PCT Pub. No.: WO2019/213673
PCT Pub. Date: Nov. 7, 2019

(65) Prior Publication Data
US 2021/0067053 A1 Mar. 4, 2021

Related U.S. Application Data

(60) Provisional application No. 62/665,180, filed on May 1, 2018.

(51) Int. Cl.
*H02M 1/32* (2007.01)
*H02M 7/219* (2006.01)
*H02M 1/00* (2006.01)

(52) U.S. Cl.
CPC .......... *H02M 1/325* (2021.05); *H02M 1/007* (2021.05); *H02M 7/219* (2013.01)

(58) Field of Classification Search
CPC .... H02M 7/219; H02M 7/155; H02M 1/4216; H02M 1/4233; H02M 1/007; H02M 1/0074; H02M 1/0077; H02M 1/067
See application file for complete search history.

(56) References Cited

U.S. PATENT DOCUMENTS

| 5,786,992 A | * | 7/1998 | Vinciarelli | .......... H02M 1/4208 363/131 |
| 8,687,388 B2 | * | 4/2014 | Jang | .................... H02M 1/4216 363/44 |

(Continued)

FOREIGN PATENT DOCUMENTS

| KR | 10-0799446 B1 | 1/2008 |
| KR | 10-2012-0113910 A | 10/2012 |

OTHER PUBLICATIONS

Amit Kumar Singh et al., A Novel Matrix Based Non-Isolated Buck-Boost Converter for More Electric Aircraft, Oct. 23, 2016, IEEE, pp. 1233-1238 (Year: 2016).*

(Continued)

*Primary Examiner* — Gustavo A Rosario-Benitez
(74) *Attorney, Agent, or Firm* — Keating & Bennett, LLP

(57) ABSTRACT

A power supply circuit includes at least two input terminals that receive an input voltage, a transformer including a primary side electrically connected to the input voltage, a rectifier electrically connected to a secondary side of the transformer, and a boost switch electrically connected in parallel with the rectifier and a pair of output voltage terminals that include a first output voltage terminal and a second output voltage terminal. The input voltage is electrically connected to an AC source, and each of the at least two input terminals receives a different phase of the AC source.

8 Claims, 8 Drawing Sheets

(56) References Cited

U.S. PATENT DOCUMENTS

| | | | |
|---|---|---|---|
| 9,490,720 B1* | 11/2016 | Kim | H02M 1/4208 |
| 2006/0226130 A1* | 10/2006 | Kooken | H02M 3/337 |
| | | | 219/130.1 |
| 2013/0194838 A1 | 8/2013 | Jang et al. | |
| 2014/0049998 A1* | 2/2014 | Casey | H02M 7/48 |
| | | | 363/97 |
| 2014/0226382 A1* | 8/2014 | Saito | H02M 5/293 |
| | | | 363/124 |
| 2015/0311788 A1 | 10/2015 | Nandi et al. | |
| 2017/0005565 A1* | 1/2017 | Bai | H02M 3/33584 |
| 2018/0241306 A1* | 8/2018 | Takahashi | H02M 3/155 |
| 2019/0273445 A1* | 9/2019 | Cho | H03K 17/0822 |
| 2020/0212795 A1* | 7/2020 | Das | H02M 3/285 |

OTHER PUBLICATIONS

Official Communication issued in International Patent Application No. PCT/US2019/070004, dated Aug. 19, 2019.

Ratanapanachote et al., "A Digitally Controlled Switch Mode Power Supply Based on Matrix Converter", IEEE Transactions on Power Electronics, vol. 21, No. 1, Jan. 2006, pp. 124-130.

Erickson, "Some Topologies of High Quality Rectifiers", Keynote paper, First International Conference on Energy, Power, and Motion Control, May 5-6, 1997, pp. 1-6.

Murata Power Solutions, "External ORing FET Reference Circuit", MVAC Series, 2012, ACAN-42.A01, pp. 1-2.

Greff et al., "A Single-Stage High-Frequency Isolated Three-Phase AC/DC Converter", IECON 2006—32nd Annual Conference on IEEE Industrial Electronics, 2006, pp. 2648-2653.

Fagnani, "Synchronous rectification boosts efficiency by reducing power loss", Analog Applications Journal, High-Performance Analog Products, 2013, 6 pages.

Jang et al., "Three-Phase Isolated High-Power-Factor Rectifier Using Soft-Switched Two-Switch Forward Converter", APEC 07—Twenty-Second Annual IEEE Applied Power Electronics Conference and Exposition, 2007, pp. 809-815.

Greff et al., "Three-Phase PWM Buck Rectifier with High-Frequency Isolation", VII Conferencia Internacional de Aplicações Industriais, VII Induscon, 7 pages.

* cited by examiner

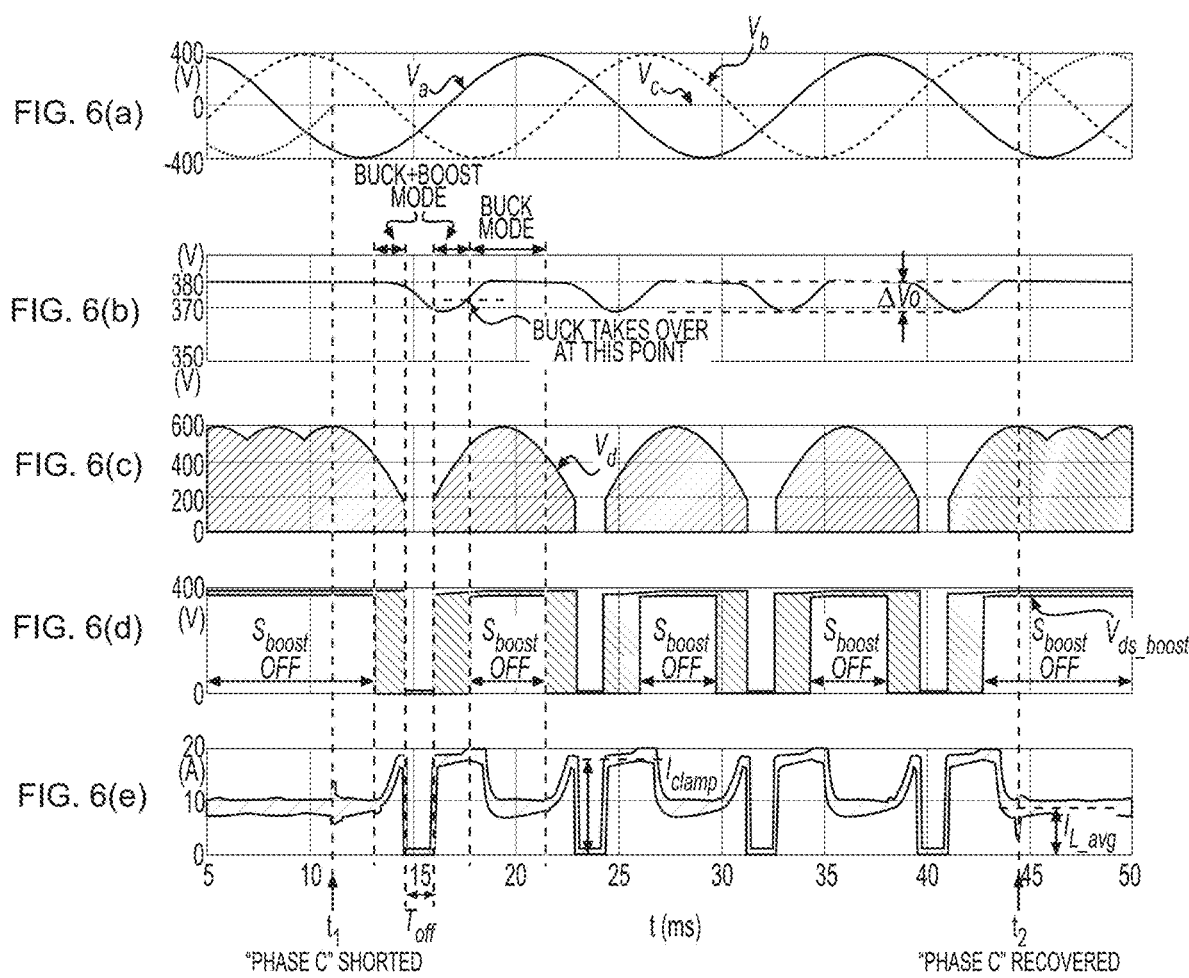

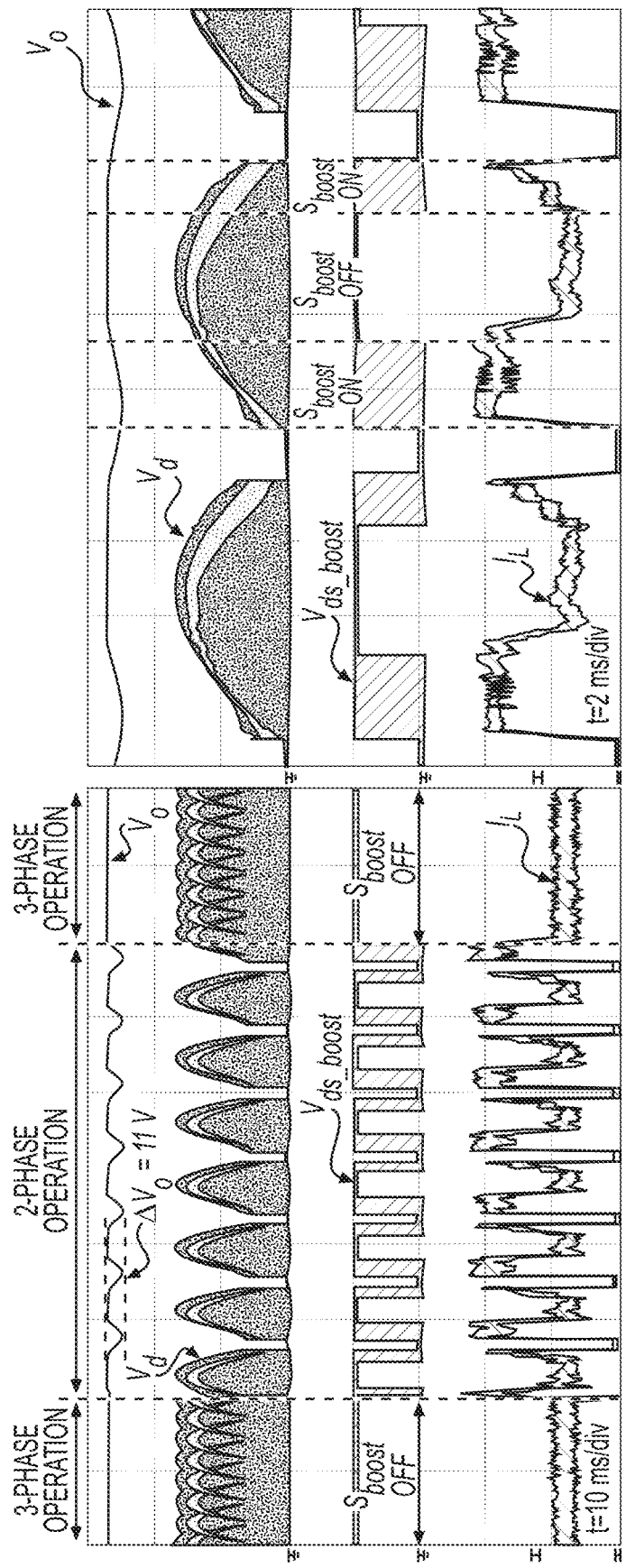

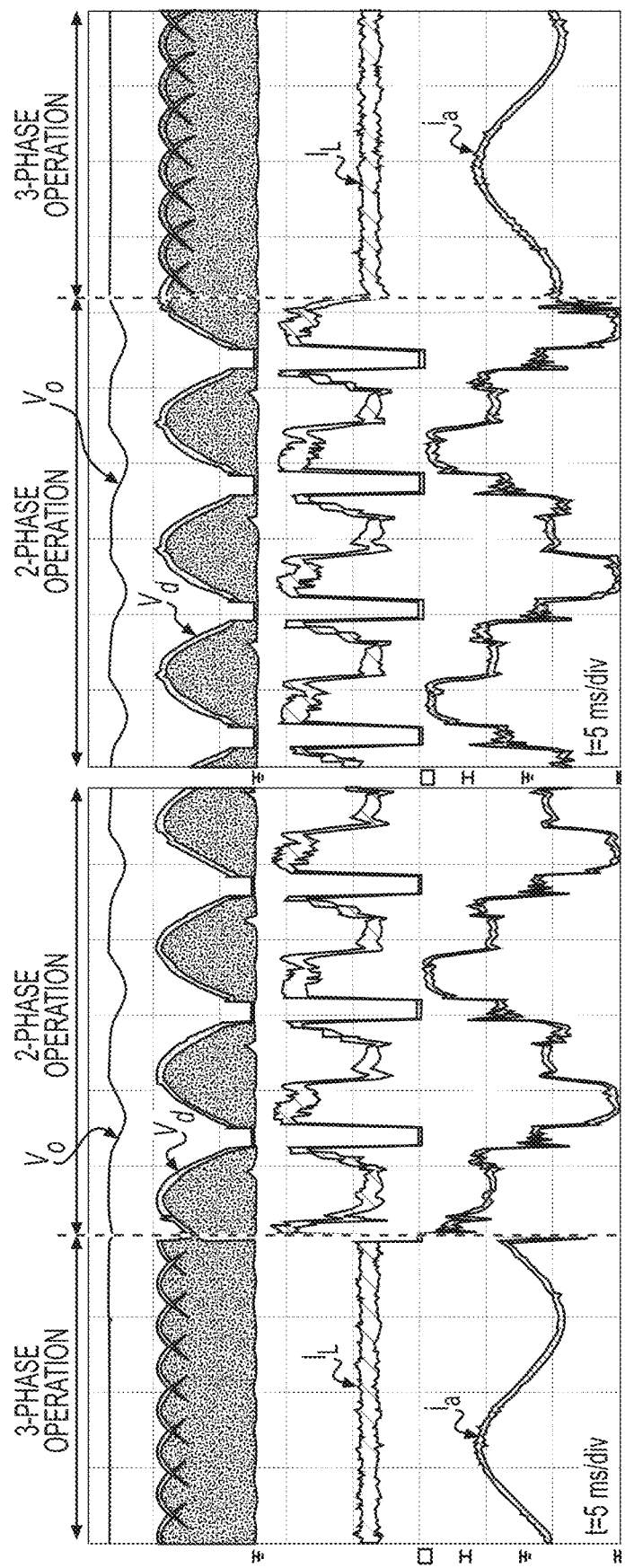

BUCK MATRIX-TYPE RECTIFIER WITH BOOST SWITCH, AND OPERATION THEREOF DURING ONE-PHASE LOSS

BACKGROUND OF THE INVENTION

1. Field of the Invention

The present invention relates to isolated matrix rectifiers. More specifically, the present invention relates to an isolated buck matrix rectifier with a boost switch and to the operation of the rectifier during the loss of one input voltage phase.

2. Description of the Related Art

FIG. 1 is a circuit diagram of an isolated buck matrix rectifier according to a related art. The matrix rectifier shown in FIG. 1 includes a 3-phase-to-1-phase matrix converter that is electrically connected to a rectifier. With respect to FIG. 1, a "line side" or "primary side" refers to the portion of the circuit on the left-hand side of a transformer Tr that is electrically connected to the input line voltages $v_a$, vb, and $v_c$ and the input line currents $i_a$, $i_b$, and $i_c$ for each of the three phases A, B, and C, and a "load side" or a "secondary side" refers to the portion of the circuit on the right-hand side of the transformer Tr that is electrically connected to the output voltage $V_o$, which may be electrically connected to a load (not shown).

On the line side of the circuit in FIG. 1, a three-phase alternating current (AC) input, including input line voltages $v_a$, $v_b$, and $v_c$, is filtered by an input-side filter defined by input inductors $L_f$ and input capacitors $C_f$ and then combined into a single-phase AC current by the 3-phase-to-1-phase matrix converter. The 3-phase-to-1-phase matrix converter includes two pairs of complementary transistors, respectively $S_{11}$-$S_{16}$ and $S_{21}$-$S_{26}$, for each of the three phases A, B, and C and provides the single-phase AC voltage vp and the single-phase AC current $i_P$ on the primary side (line side) of the transformer Tr. A leakage inductance of the transformer Tr and/or an external inductor is indicated by $L_{lk}$. On the load side of the circuit, the single-phase AC voltage vs and the single-phase AC current on the secondary side (load side) of the transformer Tr are rectified by the rectifier, which includes diodes $D_1$, $D_2$, $D_3$, and $D_4$, to provide a DC voltage $V_d$ and a DC current $i_L$. An output inductor $L_o$ and an output capacitor $C_o$ define a load-side filter, and the load-side filter filters the DC voltage Vd and the DC current $i_L$ to provide the output voltage $V_o$ and an output current $I_o$.

However, with the matrix rectifier shown in FIG. 1, the output voltage $V_o$ drops when the output voltage of the bridge rectifier (DC voltage Vd) is lower than the output voltage $V_o$, because the matrix rectifier shown in FIG. 1 does not have any boost capability.

In matrix rectifiers, it is difficult to maintain a steady output voltage and to deliver continuous power when one phase is lost, disconnected, or short circuited due to the lack of an intermediate storage energy and a second stage DC/DC converter for output voltage regulation. Therefore, problems associated with matrix rectifiers that operate when one phase is lost, disconnected, or shorted include a large output drop. For example, matrix rectifiers are unlikely to sustain an output voltage within 5% of a nominal output voltage when one phase is lost, disconnected, or shorted. To address this problem, output capacitors with relatively high values have been used to attempt to sustain the output voltage when one phase is lost, disconnected, or shorted, but including large output capacitors significantly reduces the overall power density of the matrix rectifier circuitry and prevents the matrix rectifier from having a compact size. In addition, matrix rectifiers are subjected to high stress when delivering only 2/3 of their rated output power while one phase is lost, disconnected, or shorted.

SUMMARY OF THE INVENTION

To overcome the problems described above, preferred embodiments of the present invention provide an isolated buck matrix rectifier with a boost switch.

A power supply circuit according to a preferred embodiment of the present invention includes at least two input terminals that receive an input voltage, a transformer including a primary side electrically connected to the input voltage, a rectifier electrically connected to a secondary side of the transformer, and a boost switch electrically connected in parallel with the rectifier and a pair of output voltage terminals that include a first output voltage terminal and a second output voltage terminal. The input voltage is electrically connected to a three-phase AC source, and each of the at least two input terminals receives a different phase of the AC source.

Preferably, the power supply circuit further includes ORing diodes or Field Effect Transistors (FETs) that include a first terminal electrically connected to a first terminal of the boost switch and a second terminal electrically connected to the first output voltage terminal.

Preferably, the power supply circuit further includes an output filter electrically connected to an output of the rectifier.

Preferably, the output filter includes an output inductor and an output capacitor.

Preferably, the output inductor is electrically connected between the output of the rectifier and the first terminal of the boost switch, and the output capacitor is electrically connected between a node electrically connecting the second terminal of the ORing diodes or FETs and the first output voltage terminal and a node electrically connecting the second output voltage terminal and a second terminal of the boost switch.

Preferably, each of the different phases of the AC source are combined into a single phase on the primary side of the transformer. The different phases of the AC source are preferably combined into the single phase by a matrix rectifier.

Preferably, the power supply circuit further includes an input filter electrically connected between each of the at least two input terminals and the transformer.

Isolated buck matrix rectifiers each with a boost switch according to the preferred embodiments of the present invention are able to significantly reduce or prevent a drop in the output voltage compared with a nominal output voltage and to significantly reduce an output capacitance. Further, isolated buck matrix rectifiers each with a boost switch according to the preferred embodiments of the present invention are able to provide a high power density in a compact size, while also significantly reducing a current stress on the included circuit components.

The above and other features, elements, steps, configurations, characteristics and advantages of the present invention will become more apparent from the following detailed description of preferred embodiments of the present invention with reference to the attached drawings.

BRIEF DESCRIPTION OF THE DRAWINGS

FIGS. 6(a)-6(e) are graphs showing simulated waveforms of voltage and current characteristics over time of a three-phase rectifier with a boost switch when one phase is shorted and then recovered, according to a preferred embodiment of the present invention.

FIGS. 7(a)-7(d) are graphs showing experimental waveforms of a voltage converter including a three-phase rectifier with a boost switch both during three-phase operation and during two-phase operation, according to a preferred embodiment of the present invention.

DETAILED DESCRIPTION OF PREFERRED EMBODIMENTS

Preferred embodiments of the present invention will now be described in detail with reference to FIGS. 2 to 7(d). Note that the following description is in all aspects illustrative and not restrictive and should not be construed to restrict the applications or uses of preferred embodiments of the present invention in any manner.

Figure 1:
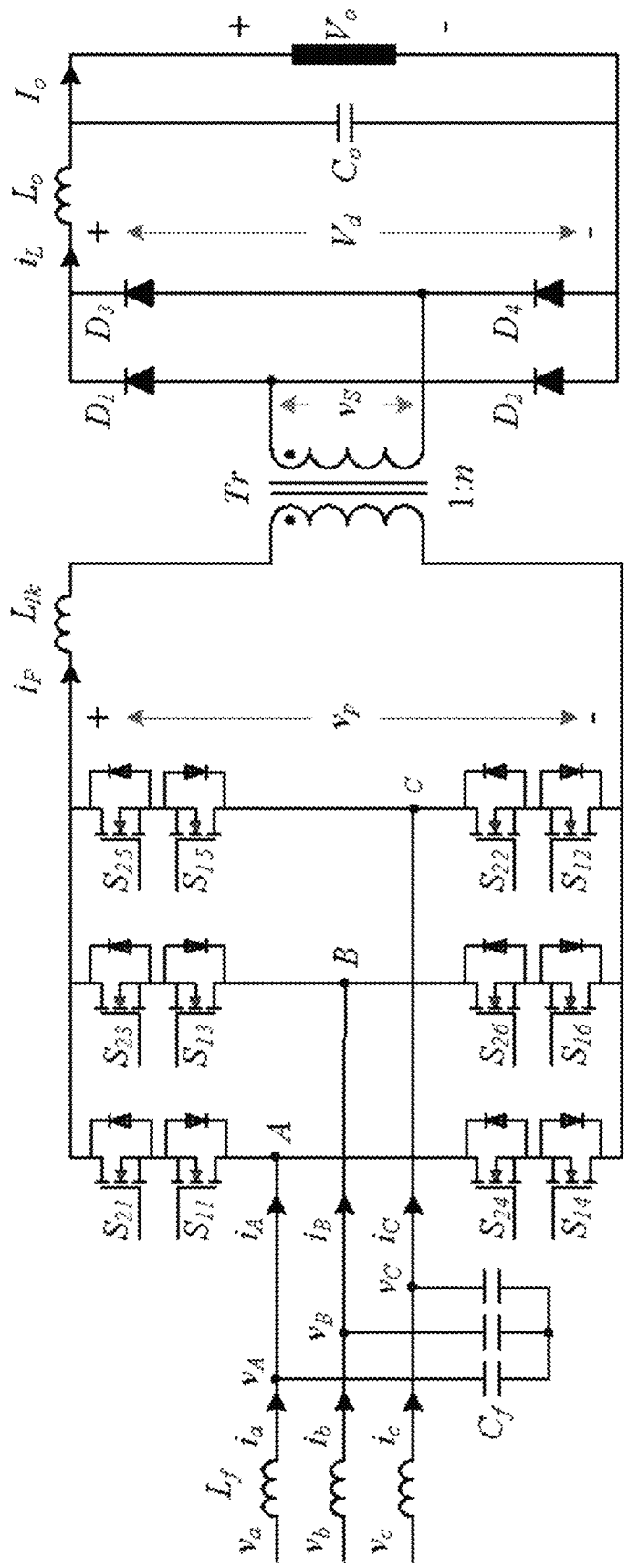
FIG. 1 is a circuit diagram of an isolated buck matrix rectifier according to a related art.
Figure 2:
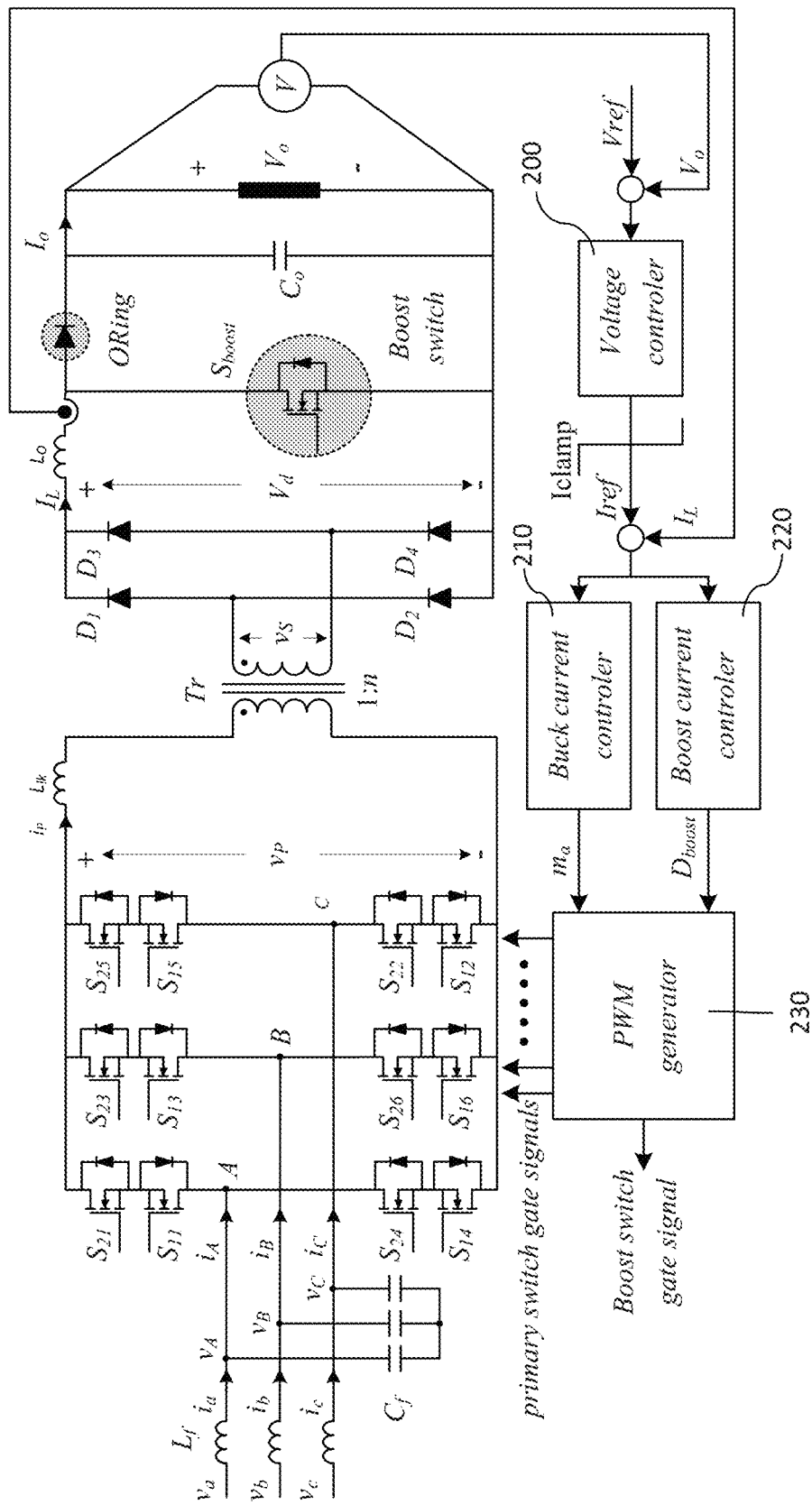
FIG. 2 is a circuit diagram of an isolated buck matrix rectifier with a boost switch according to a preferred embodiment of the present invention.

FIG. 2 is a circuit diagram of an isolated buck matrix rectifier with a boost switch according to a preferred embodiment of the present invention. In contrast to the isolated buck matrix rectifier shown in FIG. 1, the isolated buck matrix rectifier shown in FIG. 2 includes a boost switch.

The isolated buck matrix rectifier shown in FIG. 2 includes a 3-phase-to-1-phase matrix converter that is electrically connected to a rectifier. With respect to FIG. 2, a "line side" or "primary side" refers to the portion of the circuit on the left-hand side of a transformer Tr that is electrically connected to the input line voltages $v_a$, $v_b$, and $v_c$ and the input line currents $i_a$, $i_b$, and $i_c$ for each of the three phases A, B, and C, and a "load side" or "secondary side" refers to the portion of the circuit on the right-hand side of the transformer $T_r$ that is electrically connected to the output voltage $V_o$, which may be electrically connected to a load (not shown).

On the line side of the circuit in FIG. 2, a three-phase alternating current (AC) input, including input line voltages $v_a$, $v_b$, and $v_c$, is filtered by an input-side filter defined by input inductors $L_f$ and input capacitors $C_f$ and then combined into a single-phase AC current by the 3-phase-to-1-phase matrix converter. The 3-phase-to-1-phase matrix converter includes two pairs of complementary transistors, respectively $S_{11}$-$S_{16}$ and $S_{21}$-$S_{26}$, for each of the three phases A, B, and C and provides the single-phase AC voltage vp and the single-phase AC current $i_p$ on the primary side (line side) of the transformer Tr. A leakage inductance of the transformer Tr and/or an external inductor is indicated by $L_{lk}$. On the load side of the circuit, the single-phase AC voltage vs and the single-phase AC current on the secondary side (load side) of the transformer Tr are rectified by the rectifier, which includes diodes $D_1$, $D_2$, $D_3$, and $D_4$, to provide a DC voltage $V_d$ and a DC current $i_L$. An output inductor $L_o$ and an output capacitor $C_o$ define a load-side filter, and the load-side filter filters the DC voltage $V_d$ and the DC current $i_L$ to provide the output voltage $V_o$ and an output current $I_o$.

As shown in FIG. 2, a boost switch $S_{boost}$ and ORing device(s) are provided between the output inductor $L_o$ and the output capacitor $C_o$ to define a boost stage. The boost switch $S_{boost}$ can be a metal-oxide-semiconductor field-effect transistor (MOSFET) or the like, and the ORing devices can be diodes, field-effect transistors (FETs), or the like. In FIG. 2, the ORing devices are shown as a single diode between the output inductor $L_o$ and the output voltage $V_o$, but it should be understood that instead of the diode, one or more FETs in parallel can be used.

The ORing devices are conventionally used in redundant power supply systems or in systems with multiple power supplies to prevent reverse current. For example, if first and second AC-DC converters are connected in parallel, then ORing devices at the output of each of the first and second converters allow current from the first and second converters to flow to the load, while preventing current from the second or first converter from entering the other of the first or second converter. In FIG. 2, the ORing devices, in addition to providing the ORing functions described above, function as a boost diode with synchronous rectification when the DC voltage Vd of the bridge rectifier is lower than the output voltage $V_o$.

Conventionally, the ORing devices are located after the output capacitors, and boost converters generally require both boost switches and boost diodes. However, in FIG. 2, the output capacitor $C_o$ is located after the ORing devices. By connecting the output capacitor $C_O$ after the ORing devices as shown in FIG. 2, the ORing devices can operate as boost diodes. Thus, because no additional diodes are required to be included in the isolated buck matrix rectifier in order to provide boost diodes for the boost switch $S_{boost}$, overall losses and a size of the isolated buck matrix rectifier circuitry are able to be reduced.

When the DC voltage $V_d$ of the bridge rectifier is lower than the output voltage $V_o$, instead of stopping operation, the matrix rectifier of FIG. 2 continues to operate at maximum duty cycle, and the boost switch $S_{boost}$ begins switching with a controllable duty cycle to regulate the output voltage.

As shown in FIG. 2, the isolated buck matrix rectifier additionally includes a voltage controller 200 that compares the output voltage $V_o$ with a predetermined reference voltage $V_{ref}$ and outputs a reference current signal $I_{ref}$ that is limited by a predetermined clamp current $I_{clamp}$. The isolated buck matrix rectifier shown in FIG. 2 also includes a buck converter current controller 210 that compares the output inductor current $I_L$ with the reference current signal ref and outputs a buck control signal $m_a$, also referred to as a modulation index.

A boost converter current controller 220 of the isolated buck matrix rectifier shown in FIG. 2 compares the output inductor current $I_L$ with the reference current signal $I_{ref}$ and outputs a boost control signal $D_{boost}$ to a Pulse Width Modulator (PWM) generator 230 that outputs a boost switch gate signal to control a duty cycle of the boost switch $S_{boost}$. When the input line voltages $v_a$, $v_b$, and $v_c$ are high enough, the buck converter current controller 210, by itself, can regulate the output voltage $V_O$, where the duty cycle of the boost switch $D_{boost}$ is zero. When the buck control signal $m_a$ reaches its maximum value and the output voltage $V_o$ begins to lose regulation, then the boost switch $S_{boost}$ is activated to help regulate the output voltage $V_o$ by controlling the duty cycle of the boost switch $S_{boost}$.

Therefore, a value and size of the output capacitor $C_o$ is able to be relatively small if a drop in the output voltage $V_o$ is maintained at or about an output voltage drop of the isolated buck matrix rectifier shown in FIG. 1. Accordingly, a higher overall power density and more compact size are provided by the isolated buck matrix rectifier with a boost switch as shown in FIG. 2.

Figure 3B:
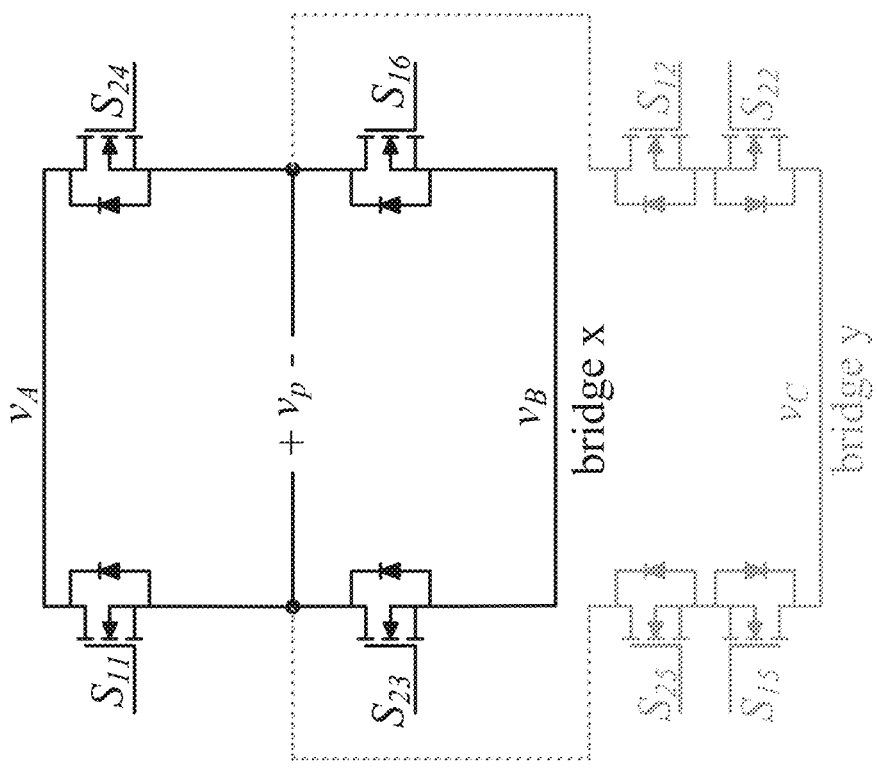
FIG. 3B is a circuit diagram of the three-phase converter shown in FIG. 3A when one of the phases is not present.
Figure 3A:
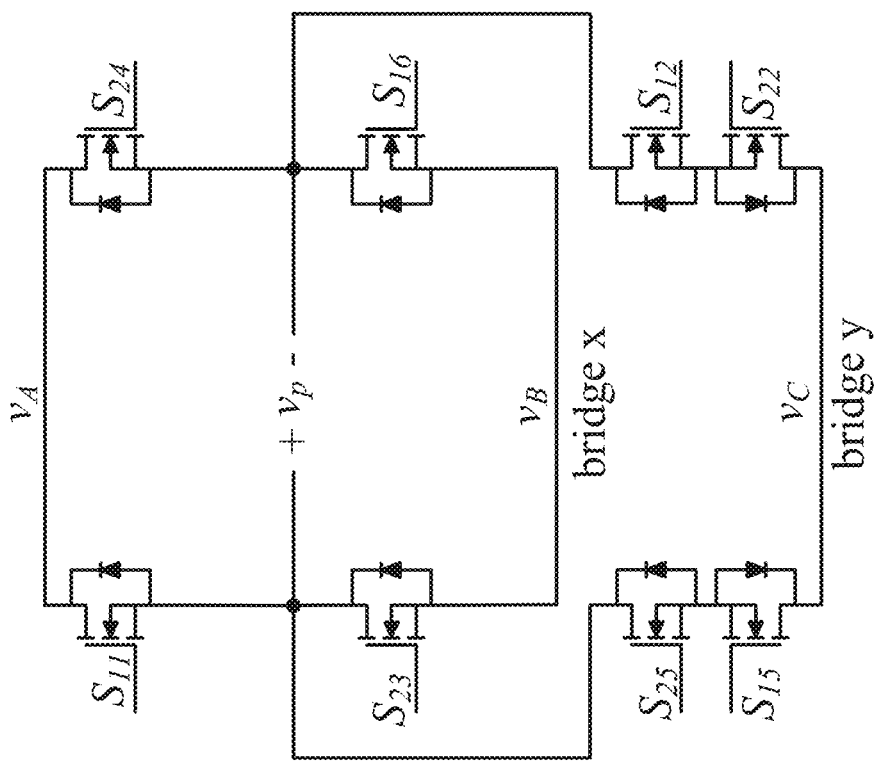
FIG. 3A is a circuit diagram of a three-phase converter of the isolated buck matrix rectifier shown in FIG. 2 redrawn as a zero voltage switching (ZVS) full-bridge DC-DC converter.

FIG. 3A is a circuit diagram of a three-phase converter of the isolated buck matrix rectifier shown in FIG. 2 redrawn as a zero voltage switching (ZVS) full-bridge DC-DC converter. FIG. 3B is a circuit diagram of the three-phase converter shown in FIG. 3A when one of the phases is not present.

When one phase of a three-phase converter is lost, disconnected, or shorted, a bridge electrically connected to this phase stops switching because no power is delivered from this phase. As shown in FIG. 3B, when phase C is lost, disconnected, or shorted, the switches of this phase (bridge y in FIG. 3A, indicated by a dashed line in FIG. 3B) are not gating (switching), and the phase circuits of phase A and phase B (e.g., bridges x and z in FIG. 3A continue normal operation (i.e., operating as a phase-shift full-bridge converter).

FIGS. 4(a)-4(d) are graphs showing waveforms of voltage and current characteristics over time of a three-phase rectifier with a boost switch during one-phase-loss operation according to a preferred embodiment of the present invention.

FIGS. 4(a)-4(d) show the principal waveforms within one input-line cycle of the AC input supply during which the input line voltage vc is zero. The switching period of the pulse-width modulation (PWM) is greatly exaggerated in FIGS. 4(a)-4(d). The PWM switching frequency is much higher than the line frequency of the AC input supply, and one input-line cycle may contain tens or hundreds of PWM periods depending on the switching frequency. Therefore, the PWM waveform of vp cannot be clearly shown if the switching period is not greatly exaggerated in the figure.

Figure 4A:
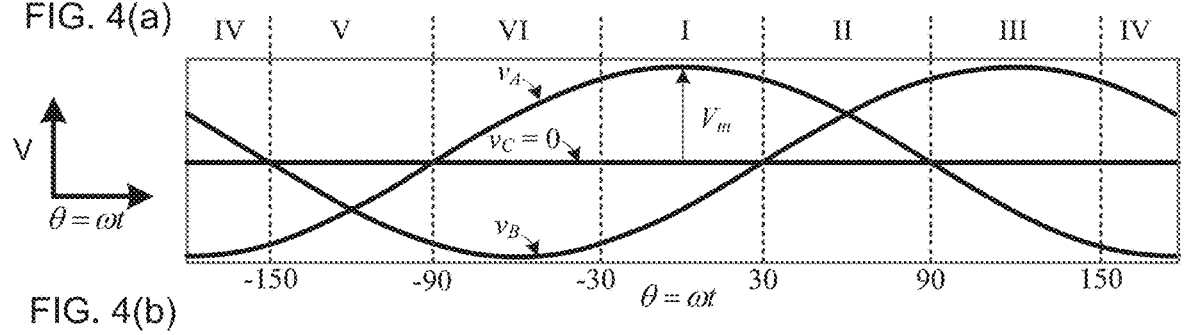
FIGS. 4(a)-4(d) are graphs showing waveforms of voltage and current characteristics over time of a three-phase rectifier with a boost switch during one-phase-loss operation according to a preferred embodiment of the present invention.

FIG. 4(a) shows an example of phase relationships θ over time of the three input line voltages $v_a$, $v_b$, and $v_c$, while $v_c$ is considered unavailable and at zero volts. As shown, $V_m$, is a vector representing maximum amplitude of the AC voltages.

Figure 4B:
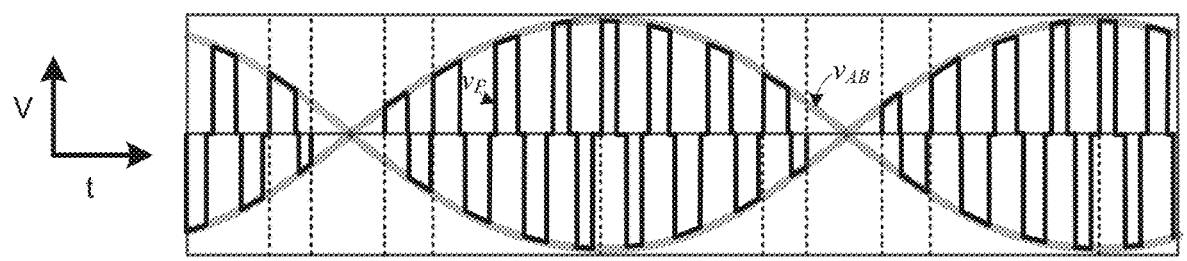

FIG. 4(b) shows the voltage $v_{AB}$ that is the difference in the input line voltages $v_A$ and $v_B$ and the single-phase AC voltage $v_P$ over time.

Figure 4C:
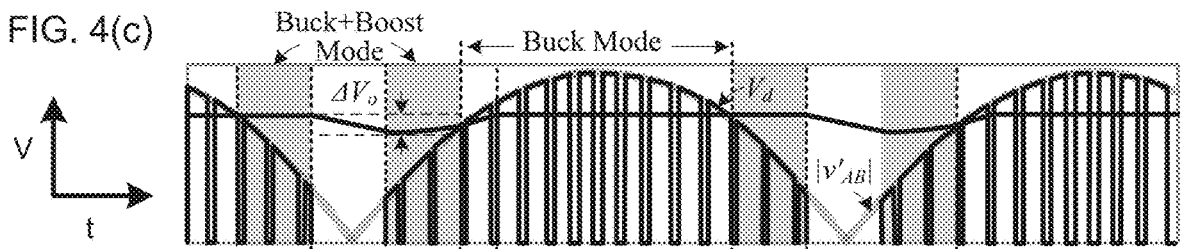

As shown in FIG. 4(c), during the shaded interval when $|v'_{AB}|$, where $v_{AB}$ is the difference in the input line voltages $v_A$ and $v_B$, is lower than the output voltage $V_o$, the boost switch $S_{boost}$ regulates the output voltage $V_o$, and the primary side of the matrix converter operates at a maximum duty cycle. Therefore, with the boost switch, the interval of the voltage turn-off time $T_{off}$ is greatly reduced compared with the case of pure buck operation, which provides a significantly lower voltage drop in the output voltage $V_o$.

However, when $|v'_{AB}|$ is lower than the minimum value required by the boost stage to regulate the output voltage $V_o$ (as determined by the maximum output inductor current and expressed in equation (2) below), the output voltage $V_o$ starts losing regulation because the output inductor current $I_L$ is clamped at the upper limit, $I_{clamp}$, by the voltage controller 200, and the duty cycle of the boost switch $S_{boost}$ reaches its maximum.

Figure 4D:
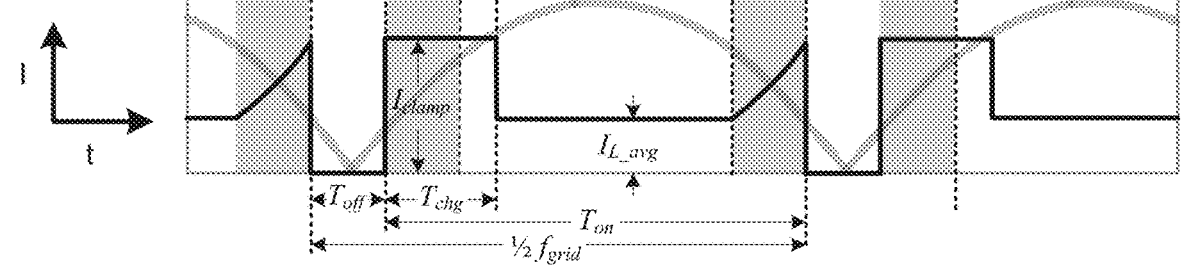

FIG. 4(d) shows a graph of the output inductor current over time in relation to $|v'_{AB}|$. As shown in FIG. 4(d), the output inductor current $I_L$ rises rapidly until it reaches the maximum value of $I_{clamp}$ when $|v'_{AB}|$ decreases. If $|v'_{AB}|$ further decreases, then very limited energy is delivered to the secondary side of the transformer Tr due to the small value of $|v'_{AB}|$ and the significantly reduced effective duty cycle of the DC voltage $V_d$ of the bridge rectifier, because the duty cycle loss is proportional to $$\frac{I_L}{|v'_{AB}|}$$

and increases rapidly as $|v'_{AB}|$ decreases. Therefore, both the primary-side switches ($S_{11}$, $S_{21}$, $S_{12}$, $S_{22}$, $S_{13}$, $S_{23}$, $S_{14}$, $S_{24}$, $S_{15}$, $S_{25}$, $S_{16}$, and $S_{26}$) and the secondary-side boost switch $Sb_{oost}$ stop switching to reduce losses when $|v'_{AB}|$ is lower than the minimum value required by the boost stage to regulate the output voltage $V_o$ (as determined by the maximum output inductor current and expressed in equation (2) below). The limit of maximum output inductor current $I_{clamp}$, expressed in equation (1) below, can be applied to both buck and boost mode control since the same inductor is involved in both buck and boost mode operation:

$$I_{clamp} = kI_{rated} \qquad \text{equation (1)},$$

where k is the over-current racial and $I_{rated}$ is the rated inductor current in nominal conditions.

When $|v'_{AB}|$ is high, duty cycle loss is relatively small and can be neglected in order to simplify the following analysis. Accordingly, assuming the duty cycle loss of the buck converter is relatively small, the minimum value of $|v'_{AB}|$ required to regulate the output voltage $$V_o \text{ at } I_o = \frac{2}{3} I_{rated}$$

(i.e., ⅔ of nominal power) can be derived by equation (2) as follows:

$$|v'_{AB}|_{min} = \frac{1}{k} n m_a V_m, \qquad \text{equation (2)}$$

where $m_a$ is the modulation index of the converter during normal operation, $V_o$, is the peak value of the phase voltage, and n is transformer turns ratio.

The interval of the voltage turn-off time $T_{off}$ in boost mode operation can be derived by equation (3) as follows:

$$T_{off} = \frac{\sin^{-1}\left(\frac{1}{\sqrt{3}k}m_a\right)}{\pi f_{grid}}, \qquad \text{equation (3)}$$

where $f_{grid}$ is a grid frequency of the input line voltages $v_a$, $v_b$, and $v_c$.

Neglecting the energy delivered from the primary side to the secondary side during the voltage turn-off time $T_{off}$, because very limited energy can be delivered from the primary side to the secondary side during $T_{off}$, the voltage drop $\Delta V_o$ during $T_{off}$ can be derived by equation (4) as follows:

$$\Delta V_o = \frac{I_o \sin^{-1}\left(\frac{1}{\sqrt{3}\,k}m_a\right)}{\pi f_{grid} C_o}. \qquad \text{equation (4)}$$

Figures 5A, 5B:
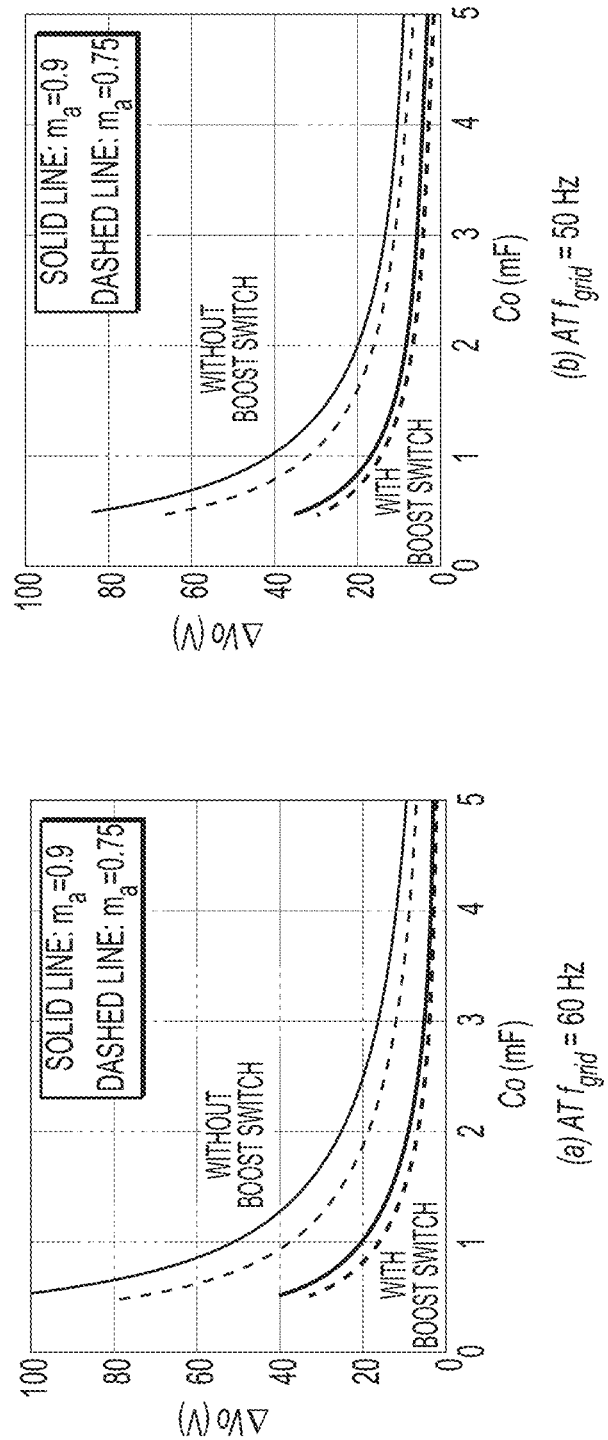
FIGS. 5A and 5B are graphs comparing an output voltage drop in one-phase-loss operation with a boost switch according to a preferred embodiment of the present invention to an output voltage drop in one-phase-loss operation without a boost switch.

FIGS. 5A and 5B are graphs comparing an output voltage drop in one-phase-loss operation with a boost switch according to a preferred embodiment of the present invention to an output voltage drop in one-phase-loss operation without a boost switch.

FIGS. 5A and 5B compare the output voltage drop $\Delta v_o$ versus the value of capacitor $C_o$ for the matrix rectifier circuit shown in FIG. 2 with and without boost switch operation. Both cases are plotted at the nominal conditions $v_{LL}=480$ V and $v_{LL}=400$ V where $m_a=0.75$ and $m_a=0.9$ respectively. Both FIGS. 5A and 5B are at the same conditions of $I_o=\frac{2}{3}\,I_{rated}$ and $k=1.4$.

Compared with buck operation, the output voltage drop $\Delta v_o$ with the boost switch $S_{boost}$ is significantly lower. According to another preferred embodiment of the present invention, the output capacitance is significantly reduced with boost mode operation if the output voltage drop is kept the same or substantially the same as that of without boost operation. The $m_a$ and grid frequency $f_{grid}$ also play very important roles in determining the output voltage drop $\Delta V_o$. Either a higher $m_a$ or a lower grid frequency $f_{grid}$ increases the output voltage drop $\Delta v_o$ according to equation (4).

Because the boost capability is achieved by only adding a boost switch Sboost, a reduction of the power density of the matrix rectifier is very small. In addition, the boost switch $S_{boost}$ only operates during a relatively small time frame indicated by the shaded intervals in FIGS. 4(c) and 4(d), when $|v'_{AB}|$ is lower than the output voltage $V_o$. Therefore, the high current through the boost switch $S_{boost}$ does not impart a high thermal stress on the boost switch Sboost.

FIGS. 6(a)-6(e) are graphs showing simulated waveforms of voltage and current characteristics over time of a three-phase rectifier with a boost switch when one phase is shorted and then recovered, according to a preferred embodiment of the present invention. FIGS. 7(a)-7(d) are graphs showing experimental waveforms of a three-phase rectifier with a boost switch both during three-phase operation and during two-phase operation, according to a preferred embodiment of the present invention.

Simulation and experimental results of preferred embodiments of the present invention are shown in FIGS. 6(a)-6(e) and FIGS. 7(a)-7(d). The operating conditions for both the simulation and experiment are as follows: the input line-to-line voltage $v_{LL}=480$ V (at $m_a=0.75$), the line frequency $f_{grid}=60$ Hz, the output inductor over current ratio $k=1.4$, and the output storage energy $C_o=1.4$ mF. In FIGS. 6(a)-6(e), at time $t_1$, "phase C" is shorted, and at time $t_2$, "phase C" is recovered. When DC voltage Vd is higher than the output voltage $V_o$, the converter operates in buck mode. When the DC voltage $V_d$ is lower than output voltage $V_o$, the boost switch is enabled, and the converter operates in buck+boost mode. The maximum inductor current $I_{hd\;clamp}$ is clamped at 18.5 A by the controller during one-phase-loss operation. At steady state, the average inductor current $I_{L\_avg}$ is around 8.77 A to deliver two-thirds of the rated power. During time period $T_{off}$, when the DC voltage $V_d$ is very low, the converter stops operating because very limited power can be transferred to the load, even with maximum inductor current $I_{clamp}$. Smooth transitions between the buck+boost mode and the buck mode can be observed from the output inductor current in FIG. 6(e). The experimental results in FIGS. 7(a)-7(d) verify the simulation results in FIGS. 6(a)-6(e).

As shown in FIGS. 7(a)-7(d), the output voltage ripple $\Delta V_0$ is about 11 V, which is well within 4% of the nominal output voltage 380 V. The waveform of $V_{ds\_boost}$ shows that the boost switch is only enabled when the output voltage of the DC voltage $V_d$ of the bridge rectifier is lower than the output voltage $V_o$, which significantly reduces thermal stresses applied to the circuit components.

The above-described features and advantages of the preferred embodiments of the present invention are able to be applied to a number of different applications, including, but not limited to, battery chargers, electric vehicle chargers high-voltage data center applications, telecommunications applications, aerospace applications, and the like.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A power supply circuit comprising:
   a matrix converter connected to first, second, and third AC phases;
   a transformer including a primary side electrically connected to the matrix converter;
   a rectifier electrically connected to a secondary side of the transformer; and
   a boost switch electrically connected in parallel with the rectifier and with a pair of output voltage terminals that include a first output voltage terminal and a second output voltage terminal; wherein
   a duty cycle of the boost switch is zero unless the third AC phase is lost, disconnected, or shorted and unless an absolute voltage difference between the first and the second AC phases is less than an output voltage of the pair of output voltage terminals.

2. The power supply circuit according to claim 1, further comprising ORing diodes or Field Effect Transistors (FETs) that include a first terminal electrically connected to a first terminal of the boost switch and a second terminal electrically connected to the first output voltage terminal.

3. The power supply circuit according to claim 2, further comprising an output filter electrically connected to an output of the rectifier.

4. The power supply circuit according to claim 3, wherein the output filter includes an output inductor and an output capacitor.

5. The power supply circuit according to claim 4, wherein:
   the output inductor is electrically connected between the output of the rectifier and the first terminal of the boost switch; and
   the output capacitor is electrically connected between a first node electrically connecting the second terminal of the ORing diodes or FETs and the first output voltage terminal and a second node electrically connecting the second output voltage terminal and a second terminal of the boost switch.

6. The power supply circuit according to claim 1, wherein the first, the second, and the third AC phases are combined into a single phase on the primary side of the transformer.

7. The power supply circuit according to claim 6, wherein the first, the second, and the third AC phases are combined into the single phase by the matrix converter.

8. The power supply circuit according to claim 1, further comprising an input filter electrically connected between the matrix converter and the transformer.

* * * * *